Nov. 16, 1948.  G. H. COULTER  2,453,702
DIRECTION SIGNALING SYSTEM FOR AUTOMOTIVE VEHICLES
Filed July 27, 1942  2 Sheets-Sheet 1
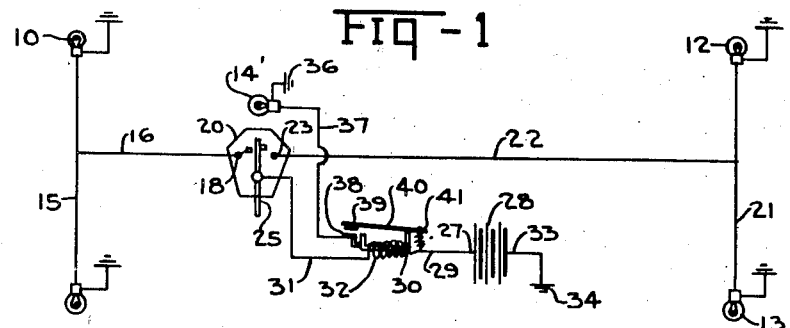
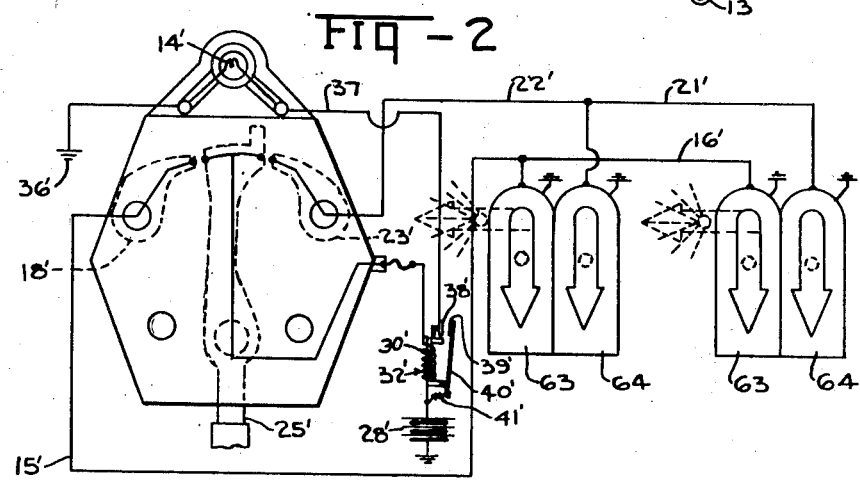
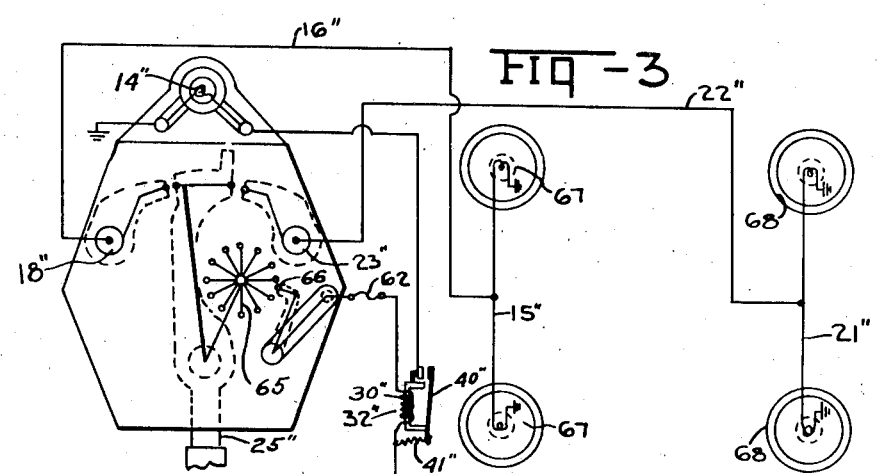
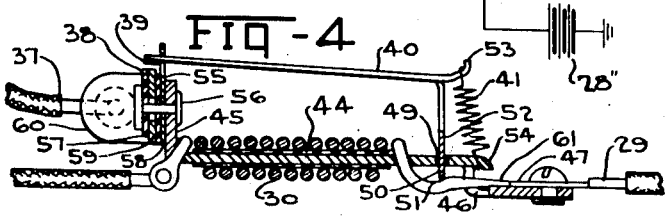
INVENTOR
*Guy H. Coulter*
BY
*Edmund B Whitcomb*
ATTORNEY

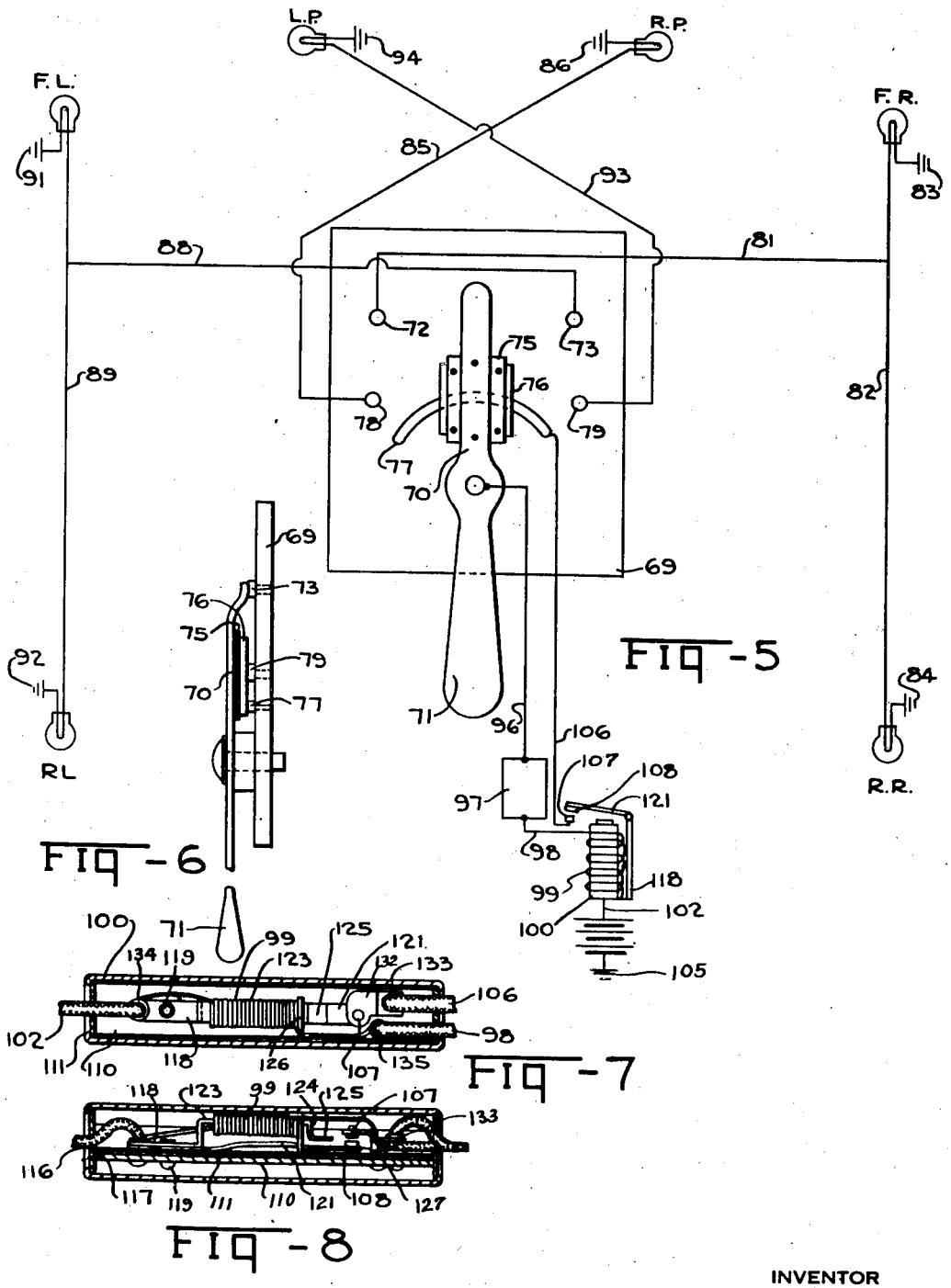

Patented Nov. 16, 1948

2,453,702

UNITED STATES PATENT OFFICE 2,453,702

DIRECTION SIGNALING SYSTEM FOR AUTOMOTIVE VEHICLES

Guy H. Coulter, Detroit, Mich., assignor to United Lens Corporation, Detroit, Mich., a corporation of Delaware Application July 27, 1942, Serial No. 452,521

3 Claims. (Cl. 177—311)

This application is a continuation in part of application, Serial No. 133,258, filed March 26, 1937, and which has become Patent 2,298,100, October 6, 1942, and relates to electrical systems and apparatus more particularly to an arrangement of electro responsive means by which the operator can readily detect the condition of electrical devices with which the same is associated.

The invention embraces the provision of an electromagnetic means of very compact size and of simple construction adapted to control devices which indicate the effectiveness of a circuit of which the means forms a part.

The invention comprehends the provision of electromagnetic switching means so constructed as to occupy a minimum space and adapted to be incorporated in a wiring harness without the necessity of providing additional supporting means therefor.

The invention has for one of its principal objects the provision of means responsive to the flow of current in a circuit for establishing a flow of current to indicating or tell-tale means so as to apprise the observer of the condition of said circuit.

The invention has for one of its objects the provision of a direction signalling system for vehicles having a plurality of tell-tale means or pilot lights to indicate to the driver of the vehicle not only whether the signalling system is working but to instantly know which of the vehicle direction indicating devices is in operation.

Another object of the invention is to provide tell-tale means to indicate at a remote point the condition of a plurality of circuits which may include one or more as well as a variety of electrically operated devices.

Another object of the invention is the provision of an electromagnetic switching device for controlling tell-tale means, the device forming a unitary structure housing the operating parts and being so arranged as to be readily inserted or applied to an established circuit or wiring harness without the necessity of making material changes.

A further object of the invention is the provision of a circuit arrangement including tell-tale means for enabling the observer to instantly detect in a system including a variety of devices if the selectively connected devices are working properly as well as indicating if the proper relation is present between the position of the controls with the devices in operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a diagrammatic view of a signalling system embodying the invention;

Figure 2 is a somewhat diagrammatic view of another type of signalling system embodying the invention;

Figure 3 is a diagrammatic view of another form of signaling system similar to the one shown in Figure 2 but employing flashing means for indicating vehicle direction signals;

Figure 4 is a sectional view of a self-contained electro-responsive switching device of the invention;

Figure 5 is a diagrammatic view of a signalling system illustrating the arrangement of the visual indicators, the modified form of switching means and electrical circuit connections;

Figure 6 is a side elevational view of the manually operated switching means;

Figure 7 is a top plan view with the housing in section showing a modified form of electro-responsive switching means;

Figure 8 is a side elevational view of the device illustrated in Figure 7 with the housing shown in section.

The drawings illustrate the principles of the invention and their application to a signalling system for vehicles, but it is to be understood that the invention is not limited to the particular form or systems shown, but that the same or the component features are susceptible of many variations for the purpose of indicating the condition of other electrically operated devices, or in association with any type of signals or signalling systems or wherever the invention may be found to have utility.

Referring to the drawings and particularly to Figure 1 wherein there is diagrammatically illustrated the application of the invention to a signalling system for vehicles, it will be seen that the embodiment shown includes four electroresponsive devices which may be used as warning signals or vehicle direction indicators 10, 11, 12, and 13 visible from the exterior of the vehicle and a visual pilot or tell-tale means 14 readily observable by the driver for indicating the proper or improper functioning of the system. The signalling devices or illuminating means are preferably located to each side and at the front and rear of the vehicle body being preferably secured to each of the fenders so that observers located at the front or rear of the vehicle are apprised of a warning signal or that a vehicle turn is intended to be made by the driver. The pilot or tell-tale means 14 are remotely located from the illuminating devices and preferably mounted on the instrument panel or in a position readily observable by the driver or other occupants of the vehicle, the pilot being preferably located back of a lens or cover of clear or colored glass.

The signalling devices or light sources 10 and 11 adapted to indicate a "left" vehicle turn are shown as inter-connected by a conductor 15 and by lead 16 connected to a stationary contact 18 of the selector switch or main controller 20 while the signalling devices or light sources 12 and 13 adapted to indicate a "right" vehicle turn are inter-connected by means of conductor 21 and by lead 22 connected to a stationary contact 23 of the controller 20. The stationary contacts 18 and 23 of the controller 20 are located on opposite sides of the selector contacting member or circuit closer shown in the form of a pivotally mounted switch blade 25 of conducting material having a central or neutral position and adapted to be selectively moved in the same direction as the proposed vehicle turn, in either a right or left hand direction for engaging either of the contacts 18 or 23.

The controller 20 is preferably in the form of a unitary assembly of a type similar to the one illustrated and described in application Serial No. 133,258 referred to supra. It is intended that the controller 20 be located in a position accessible to the driver in order that the driver can move the operating handle of selector or switch blade 25 without removing his hands from the steering wheel. The switch blade 25 is connected to a storage battery 28 or other suitable source of current by means of lead 31 connected to one of the terminals of the winding 30 of an electro-magnetic switching means which is preferably in the form of a series type or a current responsive relay 32, while the other terminal of winding 30 is connected by lead 29 to the battery terminal 27. The other terminal 33 of the battery 28 is grounded as at 34 and one of the terminals of each of the illuminating devices 10 to 13, inclusive, is shown grounded providing a common return for the flow of current in the main working circuit, the condition of which is indicated by suitable means such as a tell-tale means 14.

The tell-tale means are shown in the form of a signal lamp 14 adapted to give a visual indication when the illuminating devices are working properly. The lamp 14 is preferably grounded as at 36 having its other terminal connected by a conductor 37 to a suitable insulated stationary contact 38 forming part of the switching means operated by the relay 32. The stationary contact 38 is adapted to be engaged by a contact 39 carried by the pivoted armature 40, and these contacts are normally retained out of engagement by a spring 41. The armature 40 is connected by the conductor 29 to the battery for establishing a secondary circuit between the battery and the tell-tale lamp 14 when the contacts 38 and 39 are in engagement due to the energization of winding 30 of the relay 32.

The electro-responsive switching means or relay 32 of the invention is of very compact size, of great simplicity and so constructed that the same can be readily incorporated at any point of the main working circuit, the condition of which is to be indicated by the tell-tale means, without the necessity of providing supporting means thereof. A form of construction embodying these features is shown in Figure 4 and the same includes a magnetizable frame or core having a substantially rectangular cross-section and an L-shaped configuration formed by the uniplanar central section 44 terminating into the vertical arm 45 and having at its other end a slight bent portion 46 which terminates into a terminal receiving or connecting section 47. One end of uniplanar section 44 is provided on its upper surface with a transverse groove 49 and has a central opening 50, the latter adapted to accommodate the finger 51 formed at the extreme end of the armature 40 while the side portions adjacent the finger 51 rest on the groove 49 forming a suitable pivot means for the armature 40. The central portion of the vertical section 52 of the armature is struck-up forming a hook shaped member 53 to which is connected one end of the biasing spring 41 while the other end is connected to a hooklike member 54 formed by a struck-up portion of the section 46 of the core member providing means for normally holding the contact 39 away from contact 38. The hook-like members 53 and 54 can be bent relative to each other providing means for readily changing the force of the spring 41.

To regulate the air gap or the extent of movement of the armature away from the core as well as to adjust the amount of separation of the contact 39 carried thereby from the stationary contact 38, I provide a deformable member 55 having a slot through which the end of the armature carrying the contact 39 projects. The member 55 is secured to the magnetizable arm 45 by suitable fastening means 56 which also serve to retain to the arm 45 through suitable insulating members or washers 57 and 58 an L-shaped current conducting bracket 59 carrying the stationary contact 38. The L-shaped bracket 59 is provided with a suitable terminal post 60 to which is connected one end of the lead 37 which connects the contact with the tell-tale means 14. The uniplanar section 44 of the magnetizable core is surrounded by a plurality of turns of suitable insulated wire forming the energizing winding 30, one end of this winding is connected to the terminal section 47 of the core as at 61 and hence to the battery by means of lead 29. The other end of the winding 30 terminates into a suitable binding post or terminal adapted to receive the end of lead which connects this end of the winding to the selector switch blade 25.

In order that a visual indication will be produced by the tell-tale means or lamp 14 upon the actuation of the switch blade 25 to either of its operative positions only when both signalling devices comprising each set are functioning properly, the number of turns of the winding 30 should be such in relation to the value of the current consumed by both signalling devices that the magnetic flux produced thereby acting on the magnetic core will be of a sufficient value to attract the armature 40 overcoming the effect of the spring 41 so that the contact 39 will be urged in positive engagement with the stationary contact 38. The engagement of contacts 39 and 38 will close the circuit between the tell-tale means and the battery 28 indicating by the illumination produced by the pilot light 14 the condition of the signalling system and apprising the driver or other occupants of the vehicle that the signalling devices are performing their proper functions. It is contemplated that under abnormal conditions particularly in the event that one of the signalling devices is inoperative such as by a burn out of the illuminating lamp or an open connection in the circuit, or failure of the selectively operated controller to establish the signalling circuit when actuated, the value of the magnetic flux will be ineffective to overcome the spring 41 and attract the armature 40 to close the tell-tale circuit so that the tell-tale lamp 14 will, by its remaining dark when the controller switch blade 25 is actuated or set in one of its operative positions, indicate at once that the signal system is inoperative.

The arrangement of the electro-responsive telltale means dependent for functioning upon a predetermined flow of current in the main working circuit which is diagrammatically illustrated in Figure 1 is shown in Figure 2 as incorporated in a signalling system for motor vehicles including two sets of electrically operated arrows 63 and 64 which are not only movable from the position shown in full lines to the one shown in dotted lines but which are illuminated for better visibility when reaching such position. The operation of the system is controlled by manually moving the pivoted switch blade 25' in a right or left hand direction so that the same is set in to engagement with either of the contacts 18' or 23' to which are respectively connected by leads 15' and 16' the set of the "left" turn indicating arrows 63 and by leads 21 and 22 to the "right" turn indicating arrows 64. The switch blade 25' is adapted to be automatically returned to its central or normal ineffective position after the vehicle turn has been completed by suitable means actuated by the steering wheel or by a timed mechanism preferably of the type disclosed in Patent 2,230,994 of February 14, 1941.

The pilot or tell-tale means 14' is shown as carried by the switch casing having one terminal grounded as at 36' and at the other terminal connected by lead 37' to the stationary terminal 38' of the electro-magnetic switching means or relay 32'. The terminals of energizing winding 30' of the relay are respectively connected to a battery 28' and to the switch blade 25' so that its magnetic flux acting on the armature 40' is dependent on the amount of current flowing to the set of signalling arrows the circuit of which is established by the engagement of the switch blade 25' with either of the contacts 18' or 23' as the case may be. If the switch blade 25' is moved into engagement with the contact 18' and the arrows 63 perform its proper function as indicated in dotted lines, the flow of current through winding 30' will set a magnetic flux of sufficient value to attract the armature 40' overcoming the restraining action of spring 41' thereby closing the circuit of the pilot lamp 14'. Thus the pilot lamp 14' will be energized visually indicating that the illuminated arrows 63 are functioning properly. However, in the event of a burn-out or other abnormal condition, the current flowing through the energizing winding 30' will not produce sufficient magnetic flux to attract armature 40' so that the tell-tale means 14' will remain inoperative. Thus the pilot lamp 14' also apprises the driver of the proper and improper operation of the system.

Figure 3 shows the principles of the invention as applicable to a flashing direction signalling system for vehicles. The system includes four illuminating elements or signalling devices, each located at either side of the vehicle body at the front and rear. Each illuminating device includes a filament adapted to be flashed or periodically energized to produce flickering or blinking "right" and "left" vehicle turn signals clearly distinct from other warning signals which may have circuits and controls entirely separate but which may form part of the signalling system disclosed in the copending application hereinbefore mentioned. The filaments of the similarly placed illuminating devices 67 indicating a "left" turn are connected by conductor 15'' and lead 16'' to the contact 18'' of the main control or switch means, while the filaments of illuminating devices 68 indicating a "right" turn are connected to contact 23'' by conductor 21'' and lead 22''. The blade 25'' is adapted to be manually moved into engagement with either of said contacts 18'' or 23'' by actuating its operating handle in the same direction of the proposed vehicle turn and automatically return to its central or normal position after the vehicle turn has been completed. In addition, the system includes means set into operation by the manual movement of the blade to either of its operative positions for causing the flashing of the filaments selectively connected. The flashing means may be of a suitable thermoresponsive type or mechanically actuated as particularly disclosed in the patent hereinbefore mentioned, which are diagrammatically illustrated as including a plurality of contacting fingers or a rotatable spider 65 adapted to periodically engage the stationary contact 66 connected by a suitable fuse 62 to one terminal of the energizing winding 30'' of the electro-responsive switching means 32'' and hence to the battery or source of current 28''.

As disclosed in United States Letters Patent 2,230,994 a spring actuated mechanism which is set into operation by the movement of the switch blade 25'' from its central to any of its operative positions causes the rotation of the contacting finger 65 to periodically engage the stationary contact 66 producing an intermittent energization or "flashing" of the signalling devices included in the circuit established by the switch blade 25''. When the switch blade 25'' is manually moved into engagement with the contact 23'' and both of the illuminating devices become energized, the current flowing through the winding 30'' will produce a magnetic flux of sufficient value to attract the armature 40'' overcoming the action of spring 41'' to thereby close the circuit of the tell-tale lamp 14'', indicating that the devices 68 are functioning properly. It should be noted that the pilot lamp 14'' will also produce a flashing visual signal due to the fact that whenever the flow of current is interrupted through the winding 30'', the circuit of the tell-tale means is also interrupted. However, in the event of an abnormal condition decreasing the current normally consumed by both of the signalling devices, the current flowing through the winding 30'' will not be of a value to produce a sufficient magnetic flux to attract the armature 40'' so that the pilot light 14'' will remain inoperative. In the form of the invention shown in Figure 3, the pilot light 14'' apprises the observer or driver of the vehicle of the proper or improper operations of the system.

Another embodiment of the invention is shown in Figures 5 to 8 in which the system includes as many tell-tale means or pilot lamps as there are signalling sets or working circuits, the condition of which is to be indicated. The system includes the provision of means for the selective energization of each set and the corresponding tell-tale means whereby the observer is readily apprised not only whether the signalling devices are functioning but instantly knows which set is in operation. The selective controlling means are preferably of a type which may be actuated manually to any of the operative positions and returned to its circuit open position by automatic means. The form of the selective controlling means is somewhat diagrammatically illustrated as including a switch supporting member 69 preferably of insulating material which pivotally supports a switch blade 70 having a central or circuit open position and adapted to be moved by its operating handle 71 in engagement with stationary contact 72 if moved in a right hand direction or in engagement with stationary contact 73 if moved in a left hand direction. The contacts 72 and 73 are fixed to the support 69. The switch blade 70 carries a block of insulating material 75 to which is fixed a current conducting element or plate 76. The plate 76 is normally in engagement with the stationary arcuate contact 77 and is adapted to form a connecting bridge between this contact and a fixed contact 78 when the switch handle 71 is moved to the right or with the fixed contact 79 when the switch handle is moved to the left. Both contacts 78 and 79 are carried by the insulating support 69.

The stationary switch contact 72 is connected by means of lead 81 to a conductor 82 which interconnects one terminal of each of the set of illuminating devices FR and RR which are front and rear right hand turn indicators located in the respective corners of the vehicle and each having a terminal grounded as at 83 and 84 respectively. The fixed contact 78 is connected by means of lead 85 to one terminal of the tell-tale means or right pilot light RP which serves to indicate when energized that a right hand turn is contemplated and has its other terminal grounded as at 86. The stationary switch contact 73 is connected by means of lead 88 to conductor 89 which interconnects one terminal of each set of illuminating devices FL and RL which serve as front and rear left hand turn indicators located at the respective corners of the vehicle and each having a grounded terminal as at 91 and 92 respectively. The fixed contact 79 is connected by lead 93 to the left pilot light LP which gives a visual indication when energized that a left turn is being effected and has a grounded terminal 94. The switch blade 70 is connected by lead 96 to a terminal of a flasher device 97 which in turn is connected by lead 98 to one terminal of the energizing winding 99 of the electro-responsive switching means 100. The other terminal of the energizing winding 99 is connected by lead 102 to the live terminal of the battery B which has its other terminal grounded as at 105. The flasher device may be of any known type either mechanically or thermostatically operated to make and break a circuit periodically or at intervals to produce a proper flashing or blinking action of the turn indicators. The arcuate contact 77 is connected by lead 106 to the stationary contact 107 of the electro-magnetic switching means which is adapted to be engaged by movable contact 108 carried by the armature and connected by lead 102 to the battery or source of current B.

Referring to Figures 7 and 8 which illustrate one of the preferred constructions of the electro-responsive switching means 100, the same constitutes a unitary assembly including a metallic supporting frame 110 preferably of non-magnetic material having a channel shaped cross-section. The uniplanar intermediate section 111 of frame 110 is covered at its inner and outer surfaces with insulating strips 116 and 117 in order to insulatingly carry the component parts of the assembly. The magnetizable core is secured to the frame by fixing the flat core portion 118 to the frame section 111 by suitable means such as the hollow rivet 119 which also serves as fixing means for one end of the movable armature 121 positioned between the core and the insulating strip 116. As shown in Figure 8 the magnetizable core is of a U-shaped formation having its central section 123 surrounded by the energizing winding 99 comprising a plurality of convolutions of conducting material suitably insulated therefrom. The core member has one of its leg portions 124 terminating into a horizontally extending flat section 125. The flat section 125 is retained in close proximity and in proper fixed relation to the movable armature 121 by means of the vertically positioned insulating block 126 provided with suitable openings or slots to receive the central core section 123 and permit the passage and movement of the armature 121 toward and away from the core section 125. The armature 121 is preferably made of magnetizable resilient spring material bowed or flexed so that the same is normally spaced from the core end section 125, and is provided at its free end 127 with a contact 108 which is preferably made of tungsten or other suitable substance capable of withstanding the deleterious effects caused by the periodic interruption of the flow of current caused by the action of the flasher device 97. Spaced from and aligned for engagement with the movable contact 108 is a stationary contact 107 the latter being carried by the free end of the bracket 132 which has its other end insulatingly fixed to the uniplanar section 111 of the frame 110 by means of a rivet 133 which also serves as a terminal or connecting post.

As shown in Figure 7 one end of the energizing winding 99 is connected to a terminal or connecting post 134 carried by the flat core section 118 while the other end of said winding is connected to a terminal or connecting post 135. The connecting posts 133, 134, 135, are insulatingly carried by the supporting frame 110 through the strips 116 and 117 and are so arranged that the end of lead 98 can be readily fixed to post 135 without interfering with the connection of the end of lead 106 to post 133 or that of the end of conductor 102 to post 134.

It is to be understood that the amount of turns of wire forming the energizing winding 99 should be of such number with relation to the current flowing to both of the illuminating devices constituting each set that the magnetic flux produced thereby acting on the magnetic core will be sufficient to attract the armature 121 flexing the same so that the contact 108 will be urged into positive engagement with the stationary contact 107 to close the circuit of the tell-tale device selectively established by the movement of the switch blade operating handle 71 so that the tell-tale will be illuminated to indicate that the turn indicators are functioning properly. Moreover, the number of turns should be such that in the event of abnormal condition such as a failure of both or either of the turn indicators to function which may be caused by a burnt-out or an open connection, the current flowing through the energizing winding 99 will not be of a value to produce a sufficient magnetic flux to attract the armature 121 so that the selectively tell-tale lamp will remain inoperative apprising the driver of the improper operation of the system.

It should be noted that the upstanding side walls of the channel shaped frame 110 provide means for insuring that proper relationship of the component elements of the electro-responsive switching means irrespective of any shocks and vibrations to which the unit may be subjected, and moreover it avoids the possibility of loose connections between the connecting post and conductors secured thereto. In addition, the unitary subassembly is surrounded by a hollow casing 138 preferably of tubular metal closed at each end by insulating discs 139 and 140. The disc 139 is formed with suitable openings for the passage of conductors 98 and 106 while disc 140 is formed with an opening for the passage of lead 102.

The operation of this form of the invention can be briefly summarized as follows: If the selector switch operator such as a driver of a vehicle desires to indicate his intention to make a left hand turn, the switch operating handle 71 is moved in a left hand direction causing the switch blade 70 to engage the contact 73 thus establishing a flow of current to both of the signalling apparatus FL and RL so that observers located at the front or rear of the vehicle are apprised that a left hand turn is going to be made by the vehicle and their attention is attracted by their flashing operation due to the action of the flasher device 97. With the switch blade 70 in engagement with the contact 73 the current flows from the battery through lead 102, energizing winding 89, conductor 98, flasher device 97, conductor 96, switch blade 70, contact 73, lead 88 and conductor 89 to the turn indicator FL and RL energizing them due to the ground return circuit. In addition, the movement of switch operating handle 71 in a left hand direction moves the current conducting element 76 into engagement with contact 79 bridging or establishing a current path with the arcuate contact 77, thus closing the circuit of the left pilot light LP which will operate in a flashing manner due to the periodic interruption of the current flowing through the winding 99 caused by the flasher device 97.

As hereinbefore stated, whenever current to both of the turn indicators of a set is flowing through the energizing winding 99 the contact 108 is in engagement with contact 107 and therefore with the contacting element 76 in engagement with stationary contact 79 the current from the battery to the left pilot light, LP, flows from the live battery terminal to lead 102, core section 118, armature 121, contact 108 in engagement with contact 107, lead 106, arcuate contact 77, conducting element 76, contact 79, lead 93 to left pilot light, LP, energizing the same due to the ground return circuit to the battery. The flashing action of the illuminating devices or turn indicators FL and RL as well as that of the left pilot light LP will take place until the left hand turn of the vehicle has been effected at which time these circuits are open by moving the switch operating handle 71 to its central position by manual or other suitable automatic means functioning in response to the completion of the vehicle turn. In case that both or either one of the left turn indicators is not functioning as for example the front FL, the current flowing through the winding 99 will not produce a magnetic flux of sufficient value to attract the armature 121 and the contact 108 will not be urged into engagement with contact 107 so that no current will flow to the left pilot light LP and the same will remain inoperative apprising the driver of the improper operation of the system.

In case that the switch operator or driver of the vehicle desires to indicate that he is going to make a right hand turn it is only necessary to move the switch operating handle 71 in a right hand direction so that the blade 70 will engage the stationary contact 72 which also will cause the conducting element 76 insulatingly carried thereby to engage stationary contact 78 so that the right hand turn indicator FR and RR as well as the right hand tell-tale means RP will be energized in a periodic manner due to the action of the flasher device 97. The current to the right hand indicators FR and RR will flow from the live battery terminals through conductor 102, winding 99, lead 98, flasher device 97, lead 96, switch blade 70, conductor 72, lead 84 and by conductor 82 to both of the right hand turn indicators FR and RR energizing them due to the ground return circuit to the grounded terminal of the battery B. The current to the energization of the right tell-tale means RP will flow from the live battery terminal to lead 102, core section 98, armature 121, contact 108 in engagement with contact 107, due to the value of the current flowing to both of the turn indicators FR and RR, and from contact 107 to lead 106, arcuate contact 77, conducting element 76, contact 78, lead 85 to right pilot light RP energizing the same due to the ground return circuit to the battery B.

It is contemplated that the selective switching means should be so positioned that the operating handle 71 will be moved in the same direction as the proposed vehicle turn.

In the form of invention shown in Figures 5 to 8, inclusive, the tell-tale means or pilot lights LP and RP are placed within the vehicle body suitably mounted on the dash or in a position readily observable. It contemplates that the pilot lights be properly identified by locating them preferably in back of different colored lens or proper distinctive indicia having direct visibility to not only enable the driver to instantly tell whether or not the turn indicators FL and RL on one hand or FR and RR on the other hand are working properly, but to immediately know which set of turn indicators is in operation and thus avoid the possibility of lack of correspondence between the indicator produced by the turn indicators and the direction imparted to the vehicle, thus affording the opportunity to correct any mistakes so that accidents which commonly occur with other systems due to the fact the direction signals indicate a turn to the right when the operator is in effect actuating the vehicle to make a left turn are entirely avoided.

From the foregoing specification, it can be seen that the arrangements herein disclosed are applicable to a large variety of circuits and that the main or working circuit the condition of which is to be indicated at a remote point may include one or more signalling devices in one hand or other types of electrically operated devices; and that the secondary circuit may include any suitable tell-tale means equipped to give a visual signal or capable of producing an audible signal, or a combination of both audible and visual signals.

It should be noted that the electrical resistance of the energizing winding of the electro-responsive means or relays should be relatively low in order that the amount of current needed in the system to which the relay is applied is not decreased, and therefore the carrying capacity of the wire forming the turns of the energizing winding should be of sufficient size to allow the required flow of current to the system with which the switching means is used. Moreover, as hereinbefore pointed out, the strength of the spring or bracing means for the relay armature actuating the movable contact can be increased or decreased to accommodate or suit different current values required for various systems without the necessity of providing different windings so that my arrangement includes means rendering the relay usable within a wide range of current values.

While the electro-responsive switching means or relays disclosed show the basic operating principles involved, it is to be understood that other types of electro-responsive means may be employed to meet varying operating conditions in the main or working circuit without departing from the spirit of the invention.

While the invention has been disclosed in connection with specific details of preferred embodiments thereof, it must be understood that such details are not intended to limit the invention to the specific disclosures.

What I claim is:

1. A directional signal system including a plurality of spaced directional electrical illuminating signals, one at the front of the vehicle and the other at the rear, both on the same side of the vehicle; a source of electrical energy; a main circuit having a common lead in part between said source of energy and each of said signals; a flashing device interpolated in said main circuit for periodically interrupting the circuit to said directional signals; a manually settable and automatically releasable switching mechanism whereby the operator may indicate the direction of turning of the vehicle by said directional signals; a single pilot light for both of said signals adapted to be located on the dash of the vehicle, a secondary circuit for said pilot light connected to said source of energy through said common lead, an automatically operated switch in said pilot light circuit; and electromagnetic means for controlling said pilot switch, the operating winding of said electromagnet interpolated in said main directional signal circuit and arranged to close said switch upon the passage of current sufficient to energize both of said directional signals and to open said switch when one only of said directional lights becomes non-energizable.

2. A directional signal system including two pairs of spaced directional electrical illuminating signals, one at the front of the vehicle and the other at the rear, on the opposite sides of the vehicle; a source of electrical energy; a main circuit having a common lead in part between said source of energy and each of said signals; a flashing device interpolated in said main circuit for periodically interrupting the circuit to said directional signals; a manually settable and automatically releasable switching mechanism whereby the operator may indicate the direction of turning the vehicle by said directional signals; a single pilot light for both of said signals of one pair adapted to be located on the dash of the vehicle, a secondary circuit for said pilot light connected to said source of energy through said common lead, an automatically operated switch in said pilot light circuit; and electromagnetic means for controlling said pilot switch the operating winding of said electromagnet interpolated in said main directional signal circuit and arranged to close said switch upon the passage of current sufficient to energize both of said signals of one pair and to open said switch when one only of said directional lights of said pair becomes non-energizable.

3. A directional signal and pilot indicating control mechanism for a four sided motor vehicle including a pair of spaced directional electrical illuminating signals, both on one of the four sides of the vehicle; a source of electrical energy; a main circuit having a common lead in part between said source of energy and each of said signals; a single flashing device interpolated in said main circuit for periodically interrupting the circuit to said directional signals; a manually settable and releasable switching mechanism whereby the operator may indicate the direction of turning of the vehicle to the right or to the left by said directional signals; a single pilot light for both of said signals adapted to be located on the dash of the vehicle, a secondary circuit for said pilot light connected to said source of energy through said common lead, an automatically operated switch in said pilot light circuit; and electromagnetic means for controlling said pilot switch, the operating winding of said electromagnet interpolated in said main directional signal circuit and arranged to close said switch upon the passage of current sufficient to energize both of said directional signals and to open said switch when one only of said directional lights becomes non-energizable.

GUY H. COULTER.

REFERENCES CITED

The following references are of record in the file of this patent:

UNITED STATES PATENTS

| Number | Name | Date |
|---|---|---|
| 1,154,462 | Walz | Sept. 21, 1915 |
| 1,236,541 | Cayer et al. | Aug. 14, 1917 |
| 1,365,127 | Swartwout | Jan. 11, 1921 |
| 1,623,219 | Tolmach | Apr. 5, 1927 |
| 1,980,037 | Chase | Nov. 6, 1934 |
| 2,034,866 | Harvey | Mar. 24, 1936 |
| 2,178,479 | Lamb | Oct. 31, 1939 |